US008688543B2

(12) United States Patent
Dominguez

(10) Patent No.: US 8,688,543 B2
(45) Date of Patent: Apr. 1, 2014

(54) METHOD AND SYSTEM FOR PROCESSING AND AUTHENTICATING INTERNET PURCHASE TRANSACTIONS

(75) Inventor: Benedicto Dominguez, San Bruno, CA (US)

(73) Assignee: Visa International Service Association, San Francisco, CA (US)

(*) Notice: Subject to any disclaimer, the term of this patent is extended or adjusted under 35 U.S.C. 154(b) by 1349 days.

(21) Appl. No.: 11/847,230

(22) Filed: Aug. 29, 2007

(65) Prior Publication Data

US 2008/0071682 A1    Mar. 20, 2008

Related U.S. Application Data

(60) Provisional application No. 60/823,803, filed on Aug. 29, 2006.

(51) Int. Cl.
G06Q 30/00 (2012.01)
G06Q 30/06 (2012.01)
G06Q 20/36 (2012.01)
G06Q 20/40 (2012.01)

(52) U.S. Cl.
CPC ........ *G06Q 30/0619* (2013.01); *G06Q 20/3674* (2013.01); *G06Q 20/401* (2013.01)
USPC .............................. 705/26.44; 705/67; 705/75

(58) Field of Classification Search
USPC ................... 705/26.1, 27.1, 64, 67, 75, 26.44
See application file for complete search history.

(56) References Cited

U.S. PATENT DOCUMENTS 7,376,618 B1 *  5/2008  Anderson et al. ................ 705/38
7,403,922 B1 *  7/2008  Lewis et al. ...................... 705/38
7,809,650 B2 * 10/2010  Bruesewitz et al. ............. 705/64
7,890,393 B2 *  2/2011  Talbert et al. .................... 705/35
2002/0035539 A1  3/2002  O'Connell
2002/0099649 A1  7/2002  Lee et al.
2002/0194119 A1 * 12/2002  Wright et al. .................... 705/38
2003/0208439 A1 11/2003  Rast
2004/0078328 A1 *  4/2004  Talbert et al. .................... 705/40
2004/0148256 A1  7/2004  Bramnick et al.

(Continued)

FOREIGN PATENT DOCUMENTS

WO    WO 2008/027998 A2    3/2008

OTHER PUBLICATIONS

International Search Report and Written Opinion corresponding to the PCT application No. PCT/US07/77158, date of mailing Sep. 5, 2008, 5 pages total.

(Continued)

*Primary Examiner* — Amee A Shah
(74) *Attorney, Agent, or Firm* — Kilpatrick Townsend & Stockton LLP

(57) ABSTRACT

A method for minimizing risk of a consumer performing a fraudulent Internet purchase transactions using a transaction card is disclosed herein, the method comprising receiving an enrollment verification request for a transaction from a merchant's website, transmitting the enrollment verification request to an access control server; receiving an enrollment verification response from the access control server, determining whether the transaction is risky based on at least a portion of the enrollment verification request, if the transaction is not risky, forwarding the enrollment verification response to the merchant website and it the transaction is risky, modifying the enrollment verification response to denote the transaction is risky and forwarding the modified enrollment verification response to the merchant's website.

12 Claims, 6 Drawing Sheets

(56) References Cited

U.S. PATENT DOCUMENTS

2005/0029344 A1* 2/2005 Davis .......................... 235/380
2005/0123887 A1* 6/2005 Joung et al. ............... 434/307 A
2005/0149455 A1* 7/2005 Bruesewitz et al. ............ 705/64
2005/0289052 A1* 12/2005 Wankmueller ................. 705/40

OTHER PUBLICATIONS

International Preliminary Report corresponding to the PCT application No. PCT/US07/77158, date of mailing Mar. 3, 2009, 5 pages total.

The Extended European Search Report corresponding to the Application No. 07814557, date of mailing Feb. 4, 2011, 5 pages total.

The Examiner's Report from Australian Patent Office corresponding to the Application No. 2007289166, date of mailing Mar. 30, 2011, 2 pages total.

Examination Report for European patent application EP07814557.0 (May 31, 2012).

Australia IP Examiner's Report for Australian patent application AU2007289166 (Apr. 27, 2012).

* cited by examiner

US 8,688,543 B2

METHOD AND SYSTEM FOR PROCESSING AND AUTHENTICATING INTERNET PURCHASE TRANSACTIONS

REFERENCE TO RELATED APPLICATIONS

This application claims priority to U.S. Provisional Patent Application No. 60/823,803, filed Aug. 29, 2006, entitled METHOD AND SYSTEM FOR PROCESSING INTERNET PURCHASE TRANSACTIONS.

BACKGROUND

During a transaction using a transaction card, such as a credit card, a debit card, a stored value card, a bank card, a loyalty card, a smart card and/or the like, it is important to verify a cardholder's ownership of an account to avoid a variety of problems, such as unauthorized use. Cardholder authentication is the process of verifying that the account is owned by the cardholder. For example, cardholder authentication during a "card present" transaction is performed when a merchant's representative verifies that the signature on a transaction card matches the cardholder's signature on a receipt.

Technological improvements have allowed businesses and individuals to engage in transactions in a plurality of environments. For example, cardholders can engage in traditional "in person" transactions, transactions via the Internet, transactions over the telephone and transactions through mail systems. In many cases, cardholders desire the convenience of performing transactions without having to directly visit a service provider. In doing so, the cardholder may seek to eliminate transportation time and reduce the hassle associated with, for example, shopping in a retail environment or waiting in line at a bank by performing these transactions from the privacy of their own home.

"Card not present" ("CNP") transaction volumes are increasing at least in part because of such convenience provided to cardholders and the extra sales provided to merchants. However, as CNP transaction volume increase, fraudulent transactions and the monetary losses due to such transactions are increasing as well.

FIG. 1 depicts a system diagram for a conventional transaction processing system according to the prior art. As shown in FIG. 1, a transaction processing system is logically divided into an issuer domain 110, an interoperability domain 120 and an acquirer domain 130. The issuer domain 110 includes a consumer 112 and an access control server 114 ("ACS"). The interoperability domain 120 includes a directory server 122 ("DS") and an authentication history server 124 ("AHS"). The acquirer domain 130 includes a merchant purchase interface 132 ("MPI") and an acquirer bank 134. The lines represent data transfers performed between the connected entities. Such data transfers are described more fully below in reference to FIG. 2.

FIG. 2 depicts a conventional CNP transaction flow according to the prior art. As shown in FIG. 2, a consumer adds items to a shopping cart and finalizes 205 a transaction. The MPI 132 sends 210 an enrollment verification request to a DS 122 to verify enrollment of the consumer 112. If the consumer's card number is within a card range participating in authentication, the DS 122 forwards 215 the request to the ACS 114. The ACS 114 responds 220 to the DS 122 with an enrollment verification response indicating whether authentication is available for the card number. The DS 122 then forwards 225 the enrollment verification response to the MPI 132. If the consumer's card number is not within a participating card range, the DS 122 creates and sends 230 a response to the MPI 132.

If card authentication is available, the MPI 132 sends 235 a request for payer authentication to the ACS 114 via the consumer's Internet browser 112. The ACS 114 receives 240 the payer authentication request and authenticates 245 the consumer 112 as appropriate for the card number. For example, the consumer 112 could be authenticated using a password, chip cryptogram, personal identification number or the like. The ACS 114 formats 250 and, optionally, digitally signs a response to the payer authentication request. The ACS 114 then transmits 255 the response to the MPI 132 via the consumer's Internet browser 112. In addition, the ACS 114 can transmit 260 a copy of the response (in the form of a payer authentication transaction request) to an AHS 124.

The MPI 132 then receives 265 the payer authentication response and validates 270 the response signature if the response signature was signed by the ACS 114. The MPI 132 then commences 275 an authorization exchange with its acquirer 134.

One problem with addressing fraud is determining how to provide early warning to merchants and issuers that fraud is occurring with a particular consumer's account number. Without an alert that fraud is taking place, the fraudster can continuously submit fraudulent transactions using the account number.

A need exists for methods and systems for providing early warning detection for suspicious activity.

A need exists for methods and systems for reporting suspicious activity related to CNP transactions.

A further need exists for methods and systems for providing an alert to an issuer that is not actively managing its CNP transaction processing system or authorization logic.

The present disclosure is directed to solving one or more of the above-listed problems.

SUMMARY

Before the present methods are described, it is to be understood that this invention is not limited to the particular methodologies or protocols described, as these may vary. It is also to be understood that the terminology used herein is for the purpose of describing particular embodiments only, and is not intended to limit the scope of the present disclosure, which will be limited only by the appended claims.

It must be noted that as used herein and in the appended claims, the singular forms "a," "an," and "the" include plural reference unless the context clearly dictates otherwise. Thus, for example, reference to a "transaction" is a reference to one or more transactions and equivalents thereof known to those skilled in the art, and so forth. Unless defined otherwise, all technical and scientific terms used herein have the same meanings as commonly understood by one of ordinary skill in the art. Although any methods and materials similar or equivalent to those described herein can be used in the practice or testing of the present invention, the preferred methods, devices, and materials are now described. All publications mentioned herein are incorporated herein by reference. Nothing herein is to be construed as an admission that the invention is not entitled to antedate such disclosure by virtue of prior invention.

In an embodiment, a method for minimizing risk of fraudulent Internet purchase transactions may include receiving an enrollment verification request for a transaction from a merchant website, transmitting the enrollment verification request to an access control server, receiving an enrollment verification response from the access control server, determining whether the transaction is risky based on at least a portion of the enrollment verification request, forwarding the enrollment verification response to the merchant website if the transaction is not risky, and modifying the enrollment verification response to denote the transaction is risky and forwarding the modified enrollment verification response to the merchant website if the transaction is risky.

In an embodiment, a method for minimizing risk of fraudulent Internet purchase transactions may include receiving a transaction request that pertains to a user account and contains information pertaining to the transaction, comparing the transaction request information with information contained in a historical database to determine whether the transaction is at risk for being fraudulent, modifying a response to the transaction request, if the comparison determines the transaction is risky, to note that the transaction is risky, and updating the information contained in the historical database with the transaction request information.

BRIEF DESCRIPTION OF THE DRAWINGS

Aspects, features, benefits and advantages of the present invention will be apparent with regard to the following description and accompanying drawings, of which.

DETAILED DESCRIPTION

Figure 1:
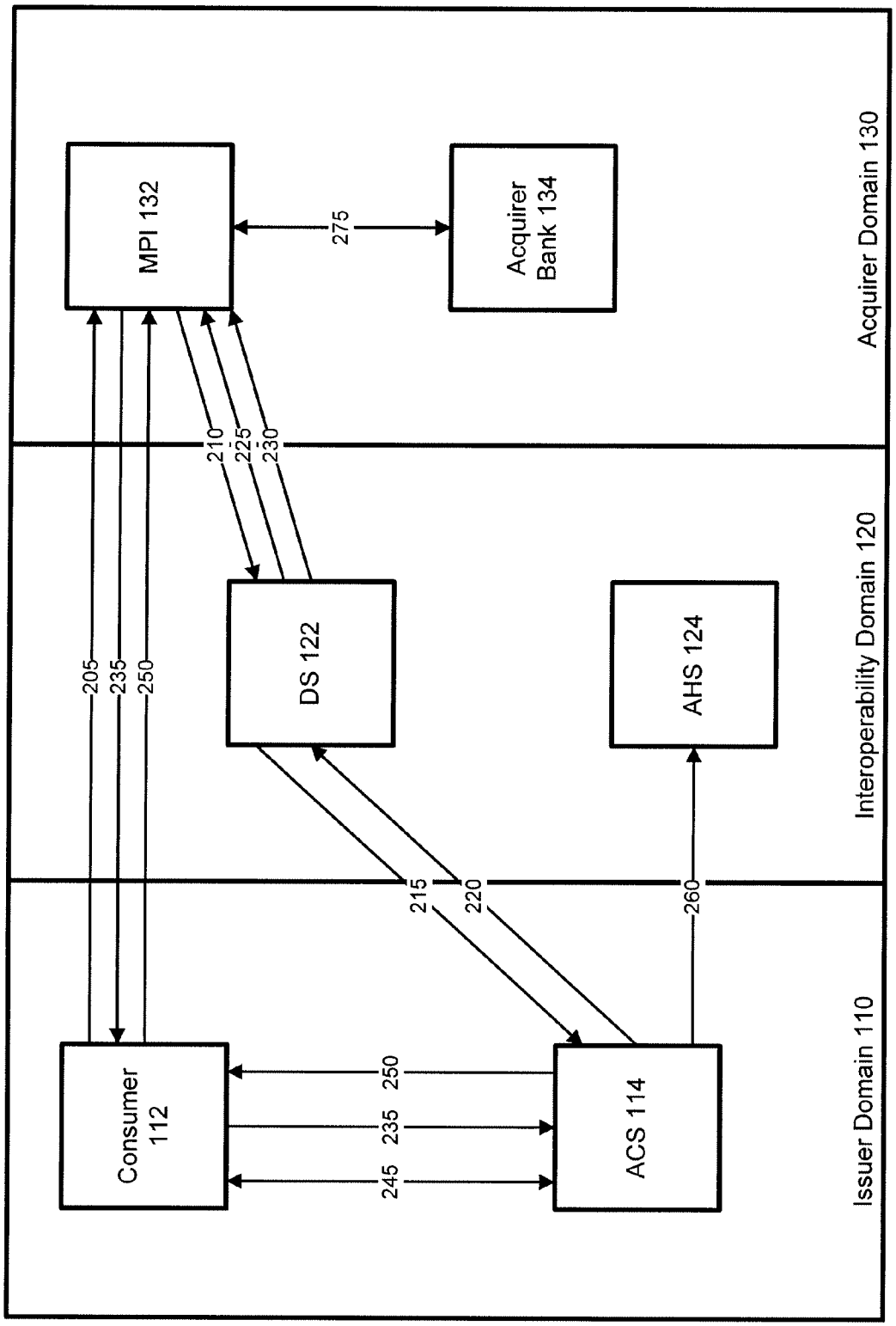
FIG. 1 depicts a system diagram for a conventional transaction processing system according to the prior art.
Figure 2:
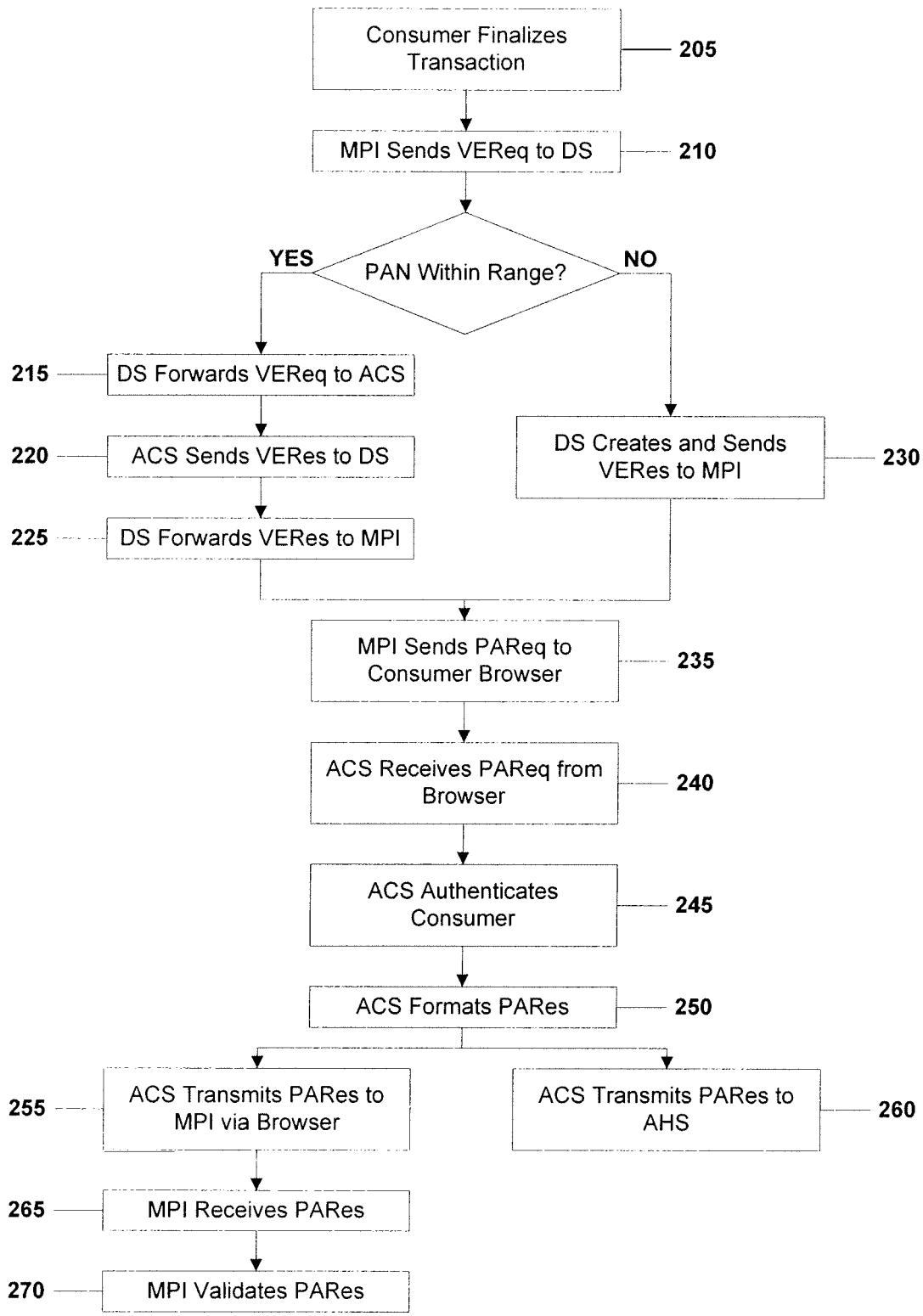
FIG. 2 depicts a flow diagram for a conventional CNP transaction flow according to the prior art.
Figure 3:
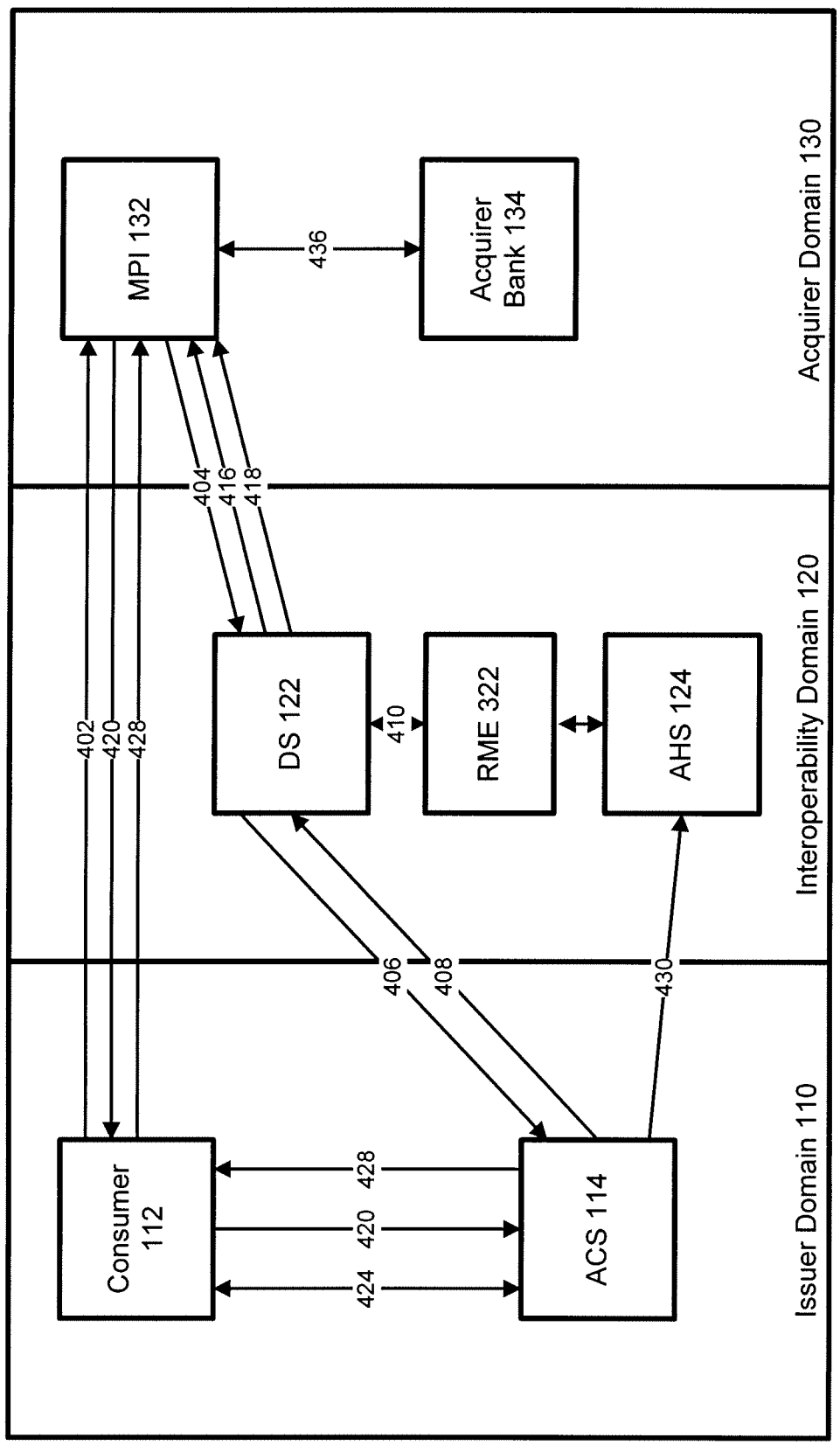
FIG. 3 depicts a system diagram for an exemplary transaction processing system according to an embodiment.

FIG. 3 depicts a system diagram for an exemplary transaction processing system according to an embodiment. FIG. 3 differs from the prior art transaction processing system in FIG. 1 at least because of the introduction of a risk management engine 322 ("RME"). The RME 322 may be used to determine whether a transaction is risky. The RME 322 may receive transaction information such as the card number used in a transaction, one or more items purchased, a merchant at which the items are being purchased, a total cost for the transaction, information pertaining to the consumer's Internet browser (e.g., the IP address), and the like. Based on the transaction information, the RME 322 may use one or more risk processing criteria to determine whether the transaction is risky (i.e., potentially fraudulent). Exemplary risk processing criteria may include, without limitation, identifying whether the consumer's account number has been previously used at the same merchant for the same amount ("velocity checking"), determining whether a dollar amount limit for the consumer's account number has been exceeded ("limit checking") and/or checking the IP address of the consumer's computer ("geo-location checking"). The RME 322 may use transaction data stored in the AHS 124 to assist in determining whether the transaction is risky. In an embodiment, the RME 322 may use different criteria based on the region, country, member and/or the like for which the transaction is processed. If a transaction and/or an account are determined to be risky, the RME 322 may transmit an alert to an issuer and/or a merchant system to warn the issuer/merchant of the potential risk. In an embodiment, the transaction may be permitted to complete, but subsequent transactions that satisfy one or more of the criteria may be denied.

Figure 4:
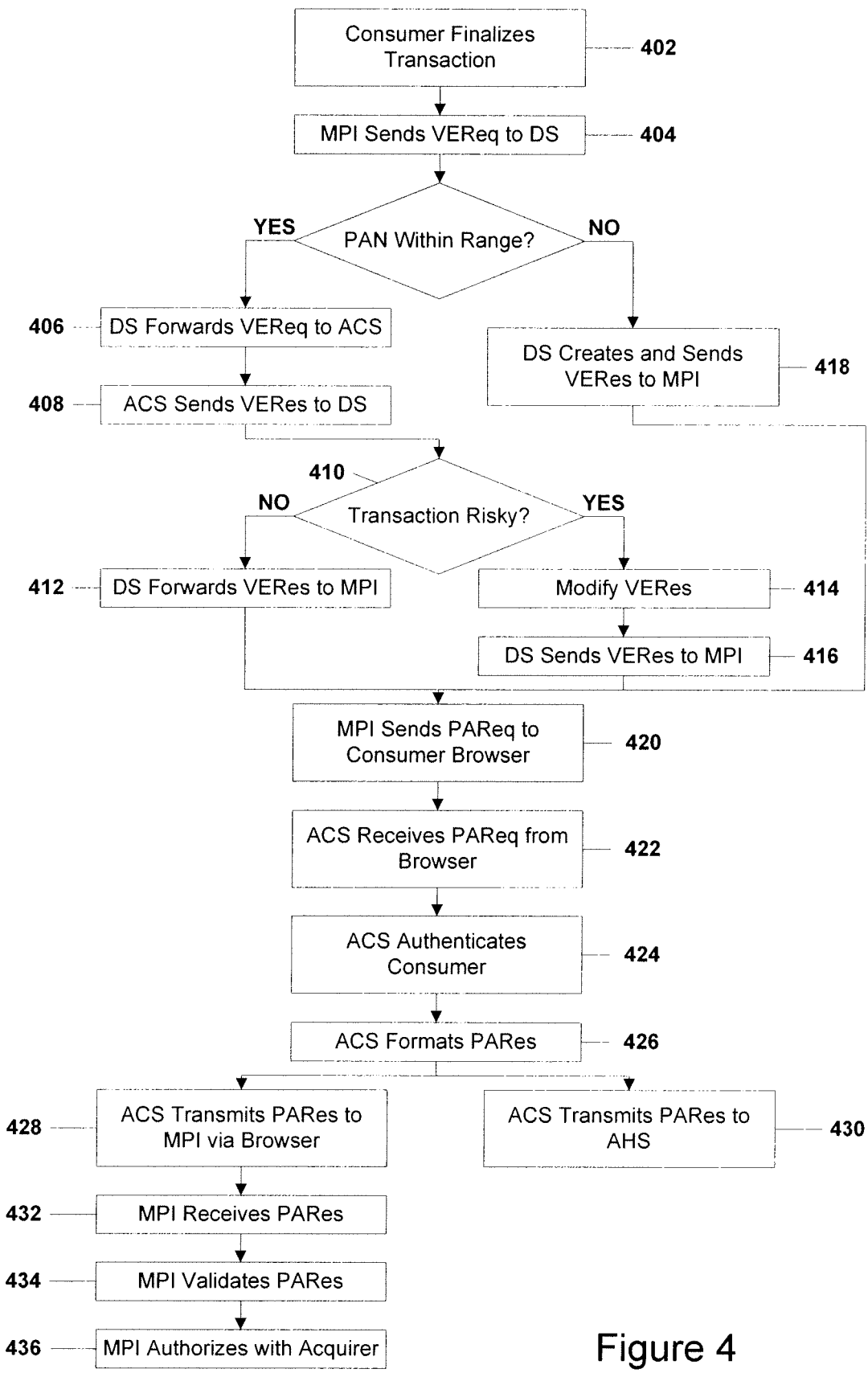
FIG. 4 depicts a flow diagram for an exemplary transaction flow according to an embodiment.

FIG. 4 depicts a flow diagram for an exemplary transaction flow according to an embodiment. As shown in FIG. 4, a consumer may select one or more items for purchase via an MPI 132 and finalize 402 purchased items. The MPI 132 may transmit 404 an enrollment verification request ("VEReq") to a DS 122 to verify enrollment of the consumer 112. If the consumer's card number is within a card range participating in authentication, the DS 122 may forward 406 the VEReq to an appropriate ACS 114. The ACS 114 may provide 408 an enrollment verification response ("VERes") to the DS 122 that indicates whether authentication is available for the card number. The DS 122 may invoke 410 the RME 322 to determine whether the transaction is risky. If the RME 322 determines that the transaction is non-risky, the DS 122 may forward 412 the VERes provided 408 by the ACS 114 to the MPI 132. If the RME 322 determines that the transaction is risky, the VERes provided 408 by the ACS 114 may be modified 414 to denote that the transaction is risky and/or unauthorized. In an embodiment, a current transaction may be allowed to complete without modification 414 regardless of the determination of risk. In such an embodiment, if the transaction is determined to be risky and/or unauthorized, future transactions having, for example, the same account number may be modified 414 to be denoted as risky and/or unauthorized transactions. The modified VERes may then be forwarded 416 to the MPI 132. If the consumer's card number is not within the participating card range, the DS 122 may create a VERes and transmit 418 it to the MPI 132.

If authentication is available for the consumer's card, the MPI 132 may transmit 420 a payer authentication request ("PAReq") to the ACS 114 via the consumer's Internet browser 112. The ACS 114 may receive 422 the PAReq and may authenticate 424 the consumer 112 in a manner that is appropriate based on the card number. For example, the consumer 112 may be authenticated 424 using a password, chip cryptogram, personal identification number or the like. The ACS 114 may format 426 and digitally sign a payer authentication response ("PARes") to the PAReq. The ACS 114 may then transmit 428 the PARes to the MPI 132 via the consumer's Internet browser 112. In addition, the ACS 114 may transmit 430 a payer authentication transaction request ("PATransReq") to an AHS 124. The AHS 124 may be a repository of information pertaining to previously performed transactions. The PATransReq may include, for example and without limitation, a merchant name, a transaction identifier, an description of purchased goods and/or services, a purchase amount, a purchase currency, a purchase date, a purchase time and the like. The MPI 132 may receive 432 the PARes and validate 434 the PARes signature. The MPI 132 may then commence 436 an authorization exchange with its acquirer 134.

Figure 5:
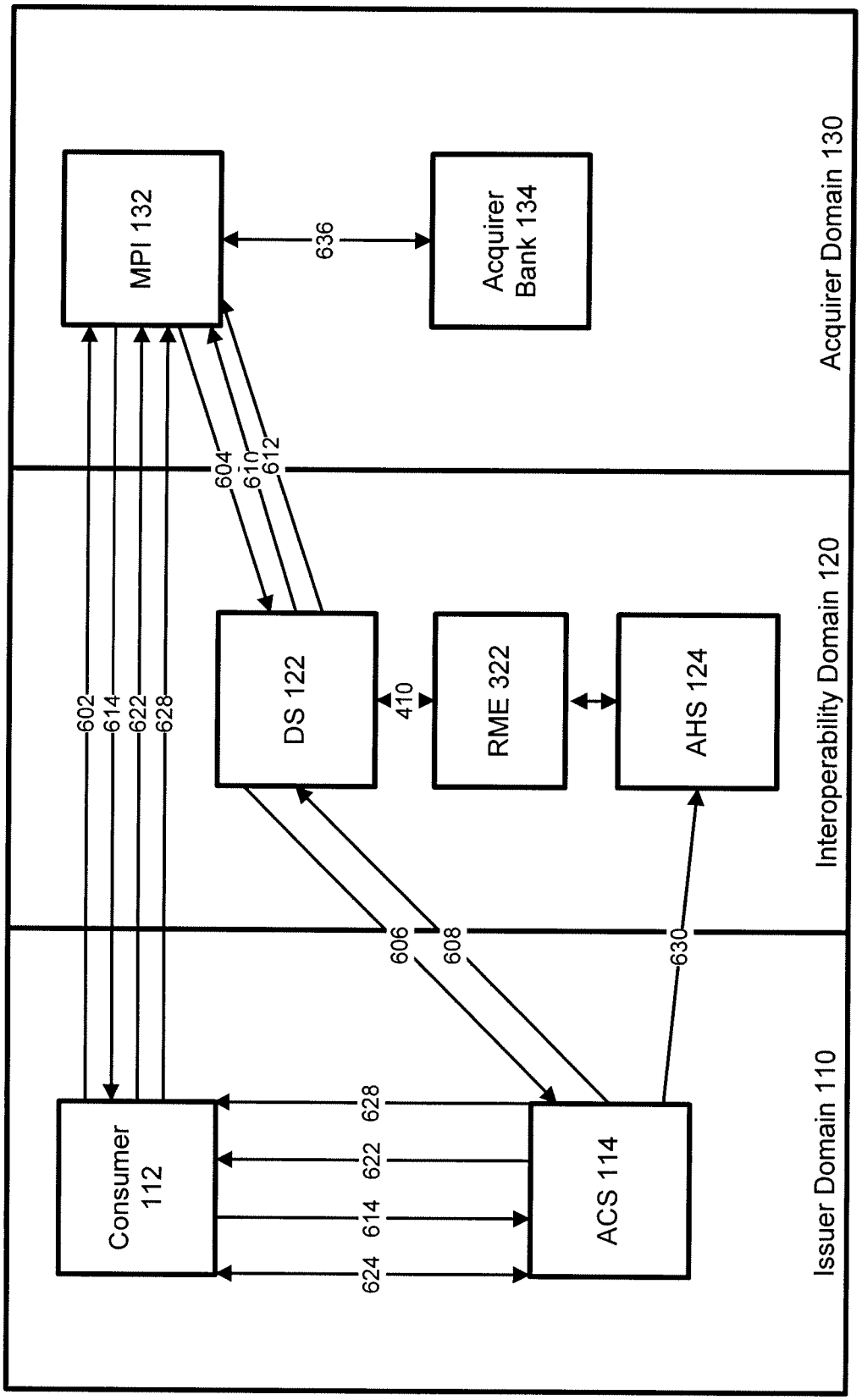
FIG. 5 depicts an alternate system diagram for an exemplary transaction processing system according to an embodiment.

FIG. 5 depicts an alternate system diagram for an exemplary transaction processing system according to an embodiment. FIG. 5 may differ from FIG. 3 in the manner in which an alert is provided. Accordingly, different entities may communicate with each other during transaction processing.

Figure 6:
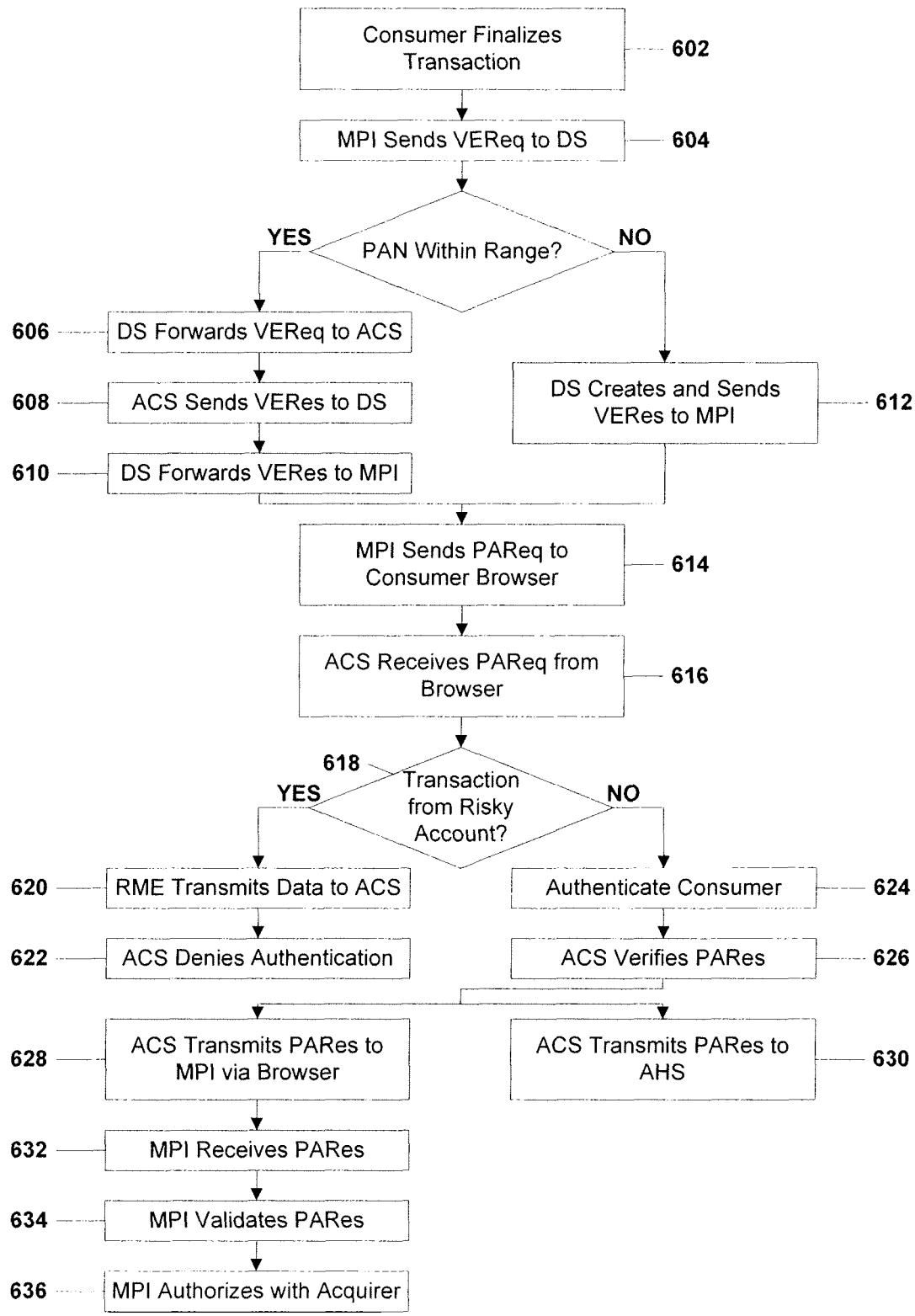
FIG. 6 depicts an alternate flow diagram for an exemplary transaction flow according to an embodiment.

FIG. 6 depicts an alternate flow diagram for an exemplary transaction flow according to an embodiment. As shown in FIG. 6, a consumer may select one or more items for purchase via an MPI 132 and finalize 602 purchased items. The MPI 132 may transmit 604 a VEReq to a DS 122 to verify enrollment of the consumer. If the consumer's card number is within a participating card range, the DS 122 may forward 606 the VEReq to an appropriate ACS 114. The ACS 114 may provide 608 a VERes to the DS 122 that indicates whether authentication is available for the card number. The DS 122 may forward 610 the VERes to the MPI 132. If the consumer's card number is not within the participating card range, the DS 122 may create a VERes and transmit 612 it to the MPI 132.

If authentication is available for the consumer's card, the MPI 132 may transmit 614 a PAReq to the ACS 114 via the consumer's Internet browser 112. The ACS 114 may receive 616 the PAReq. The DS 122 may invoke 618 the RME 322 to determine whether the transaction is from a risky account. If the RME 322 determines the account to be risky, the RME may transmit 620 data instructing the ACS 114 to respond 622 to the MPI denying payer authentication for the account. Otherwise, the ACS 114 may authenticate 624 the consumer in a manner that is appropriate based on the card number. For example, the consumer may be authenticated 624 using a password, chip cryptogram, personal identification number or the like. The ACS 114 may format 626 and digitally sign a PARes to the PAReq. The ACS 114 may then transmit 628 the PARes to the MPI 132 via the consumer's Internet browser 112. In addition, the ACS 114 may transmit 630 a PATransReq to an AHS 124. The PATransReq may include, for example and without limitation, a merchant name, a transaction identifier, an description of purchased goods and/or services, a purchase amount, a purchase currency, a purchase date, a purchase time and the like. The MPI 132 may receive 632 the PARes and validate 634 the PARes signature. The merchant 132 may then commence 636 an authorization exchange with its acquirer 134.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the disclosed embodiments.

The invention claimed is:

1. A method for minimizing risk of a consumer performing a fraudulent Internet purchase transaction using a transaction card, the method comprising, in order:
   receiving, at a directory server (DS), an enrollment verification request message for a transaction from a merchant purchase interface (MPI) to verify enrollment of the consumer, wherein the enrollment verification request message comprises an account number;
   verifying, by the directory server (DS), whether the consumer is enrolled based on whether cardholder authentication is available for the account number;
   if cardholder authentication is available for the account number, transmitting, by the directory server, the enrollment verification request message to an access control server (ACS) located at and operated by an issuer;
   receiving, at the directory server, an enrollment verification response message from the access control server;
   determining, by a risk management engine (RME), that the transaction is risky based on at least a portion of the enrollment verification request message;
   modifying, by the directory server, the enrollment verification response message to denote the transaction is risky, and
   forwarding, by the directory server, the modified enrollment verification response message to the merchant purchase interface;
   wherein after receiving the modified enrollment verification response message, the merchant purchase interface sends a payer authentication request to a consumer browser used by the consumer, which is then forwarded to the access control server,
   wherein the access control server thereafter sends a payer authentication response to the merchant purchase interface via the consumer browser, and
   wherein a merchant associated with the merchant purchase interface commences an authorization exchange with an acquirer associated with the merchant.

2. The method of claim 1, wherein determining that the transaction is risky comprises at least one of:
   identifying that the account number has been previously used at the merchant for a same amount;
   determining that a dollar amount limit for the account number has been exceeded; and
   comparing a geographic location corresponding to an IP address of a computer operated by the consumer.

3. The method of claim 1, further comprising transmitting an alert to the transaction card's issuer warning the issuer that the transaction is risky.

4. The method of claim 1, wherein the enrollment verification request message further comprises information regarding one or more items to be purchased by the consumer, a total cost for the transaction, an identity of the merchant, and information pertaining to the consumer browser.

5. The method of claim 1 further comprising receiving transaction data stored in an authentication history server to determine if the transaction is risky.

6. The method of claim 5 wherein the transaction data stored in the authentication history server includes information related to prior transactions with the merchant using the transaction card.

7. The method of claim 1 wherein determining that the transaction is risky is further determined based on a region, country, or member for which the transaction is processed.

8. The method of claim 1 wherein the cardholder is further authenticated with at least one of a password, chip cryptogram, or personal identification number.

9. The method of claim 1 wherein the merchant purchase interface is a merchant's website.

10. The method of claim 1 wherein the purchase transaction is a card not present transaction.

11. The method of claim 1 wherein the payer authentication request comprises a merchant name, and wherein the access control server further transmits a payer authentication transaction request comprising the merchant name, a transaction identifier and a description of goods to an AHS, which is a repository of information for previously performed transactions.

12. The method of claim 1 wherein the access control server verifies enrollment by checking if the account number is in a predetermined range.

* * * * *